United States Patent Office 3,464,758
Patented Sept. 2, 1969

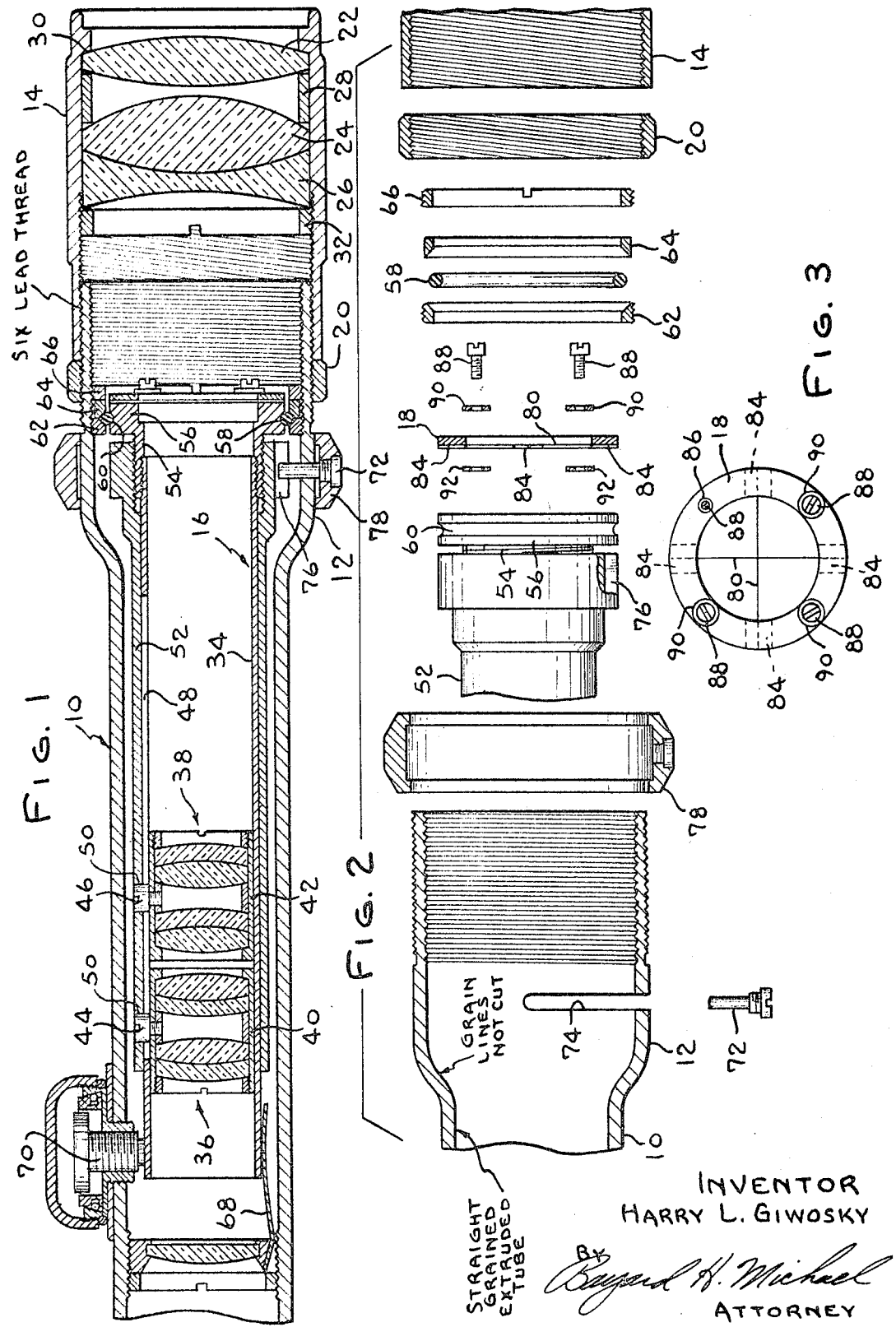

3,464,758
RIFLESCOPE WITH O-RING SUPPORT AND MULTIPLE LEAD FINE THREADED EYEPIECE
Harry L. Giwosky, Milwaukee, Wis., assignor to Realist, Inc., Menomonee Falls, Wis., a corporation of Delaware
Filed Nov. 18, 1964, Ser. No. 412,038
Int. Cl. G02b 27/36
U.S. Cl. 350—10     2 Claims

ABSTRACT OF THE DISCLOSURE

The reticle is adjustably mounted on the optical axis of the erector lens tube which is supported in an O ring allowing windage and elevation adjustment of the tube inside the scope tube. The eyepiece is mounted on fine six-lead threads assuring rapid focus before the eye can accommodate a nearly focused condition.

---

This invention relates to a variable power riflescope.

The principal object of this invention is to improve the accuracy of variable power scopes with particular emphasis on maintenance of the sighting accuracy as the scope power is varied.

Another object is to improve the scope tube design to make possible the adjustment of the reticle center to precisely coincide with the optical center of the erector lens assembly.

The foregoing object is realized by a construction which makes possible the attainment of the added object of increasing the strength of the scope while reducing the weight.

Another object is to improve the focusing of a scope.

Still another object is to provide an improved mount for the erector tube in a scope.

Other objects and advantages will be pointed out in, or be apparent from, the specification and claims, as will obvious modifications of the single embodiment shown in the drawings, in which:

FIG. 1 is a vertical section through a portion of a scope according to this invention;

FIG. 2 is an exploded view, partly in section, similar to FIG. 1; and

FIG. 3 is a detail of the reticle ring.

The objective end of scope tube 10 has not been shown since this may be of any desired construction. The present tube is fabricated of a straight-grained extruded tubing which is then drawn at the eyepiece end to provide an enlarged portion 12 on which the tubular eyepiece 14 is mounted. No grain lines are cut in, thus forming the tube so great strength is retained with thin wall sections. This results in light weight. A very important advantage lies in the added interior room for mounting the erector tube assembly 16 and its adjustable reticle support 18. The eyepiece 14 is mounted on a six-lead screw thread which permits fine threads, necessary to proper sealing, to be employed while permitting rapid focusing movement of the eyepiece. The conventional single-lead fine thread focuses so slowly that the eye tends to accommodate for out-of-focus with the result it is hard to focus the usual scope. After the scope has been focused, lock ring 20 is tightened against the eyepiece 14. With the straight inside walls of the eyepiece the lenses 22, 24, 26 and spacer 28 can be seated against shoulder 30 and retained by retainer 32.

The erector lens assembly includes support tube 34 in which two separate erector tube lens systems 36 and 38 are carried for longitudinal, nonrotary motion for varying the power of the scope. Systems 36 and 38 include tubes 40, 42 carrying four lens elements and engaged by the threaded shank of cam follower screws 44, 46. The heads of screws 44, 46 pass through the longitudinal slot 48 in tube 34 and project into a cam slot 50 in cam tube 52. As tube 52 is rotated the slot 50 imparts motion to the screws 44, 46 to move erector lens systems 36, 38 longitudinally relative to each other and to the tube 34 to vary the scope power.

The support tube 34 is threaded into member 54 which is provided with an annular shoulder 56. Cam tube 52 is threaded on member 54 and is so located by the member subject to some movement as it is turned to adjust the scope power. An O-ring 58 is mounted in groove 60 on the periphery of shoulder 56. Ring 62 is threaded into the enlarged portion 12 of the tube and has a beveled face which cooperates with a cooperating face on ring 64 to retain the O ring with respect to the tube 12. Lock ring 66 is run against ring 64 to firmly grip the O ring. This provides a resilient mount while absolutely locating the erector tube assembly in the tube. This is a great improvement over spring-biased constructions and the like of the prior art. The forward end of the tube 34 is biased by spring 68 against the elevation adjusting screw 70 and the windage screw (not shown). Here the spring is shown 180° away from screw 70 but this is for illustrative purposes—in fact it would be 135° away, i.e., midway between the elevation and windage adjusting screws. An alternative would be to provide two bias springs, each opposing one adjusting screw. As the adjusting screws are moved the erector tube assembly will move about the resilient O-ring mount.

The cam tube 52 is actuated by means of pin 72 which projects through slot 74 in tube 10 into slot 76 on the cam tube 52. Pin 72 is threaded into ring 78 mounted on tube portion 12. The ring 78 is turned to rotate tube 52 and adjust the power.

The reticle, for example, crosshairs 80, is mounted on a reticle ring 18 on the usual notched blocks 84. The reticle ring 18 is provided with oversize holes 86 through which the smaller diameter shanks of screws 88 pass. Washers 90 are used under the heads of screws 88. Shim washers 92 are used between the reticle ring and shoulder 56 to locate the reticle in the second image plane of the optical system (so the reticle appears "sharp"). Since the reticle is in the second image plane its size does not vary as the scope power is varied, this not being true when the reticle is in the first image plane. Having located the reticle in the image plane, it is then adjusted to precisely locate the crosshairs on the optical axis of the erector lens assembly. The adjustment is possible by means of the oversize holes in the reticle ring. When precisely located, the screws 88 are tightened and sealed tight. With the crosshairs on the optical axis the crosshairs will not move with change of power. It is virtually impossible to locate the reticle this precisely without such adjustment since manufacturing tolerances just are not that good. It is for this reason that it has heretofore been accepted that a variable power scope is really zeroed-in at only one power. The present scope will be zeroed-in at all powers.

Prior scope constructions probably did not have enough room to provide for reticle adjustment. The enlarged tube of the present design gives more room for both a better tube mount and for reticle adjustment. No loss of field is experienced since the internal diameter of the mount or reticle ring in no way restricts the optical system. With prior designs possibly room could be gained by increasing overall diameters but this increases weight and inertial loads too much. It may be further noted that with the reticle carried on the erector lens assembly adjustment for windage or elevation will not move the reticle from the center of the field. This reticle, therefore, remains of constant size, centered and zeroed-in as adjusted for windage and elevation or as the power is varied. This has never been accomplished before.

I claim:
1. In a telescopic sight,
a tube,
an objective lens at one end of the tube,
a tubular assembly inside the tube and including the erector lens system,
an O ring supporting one end of the assembly in the tube,
means for radially adjusting the other end of the assembly with respect to the tube,
a reticle,
means mounting the reticle on said assembly while providing for adjustment of the reticle to coincide with the optical axis of the erector lens system,
and an eyepiece mounted on the other end of the tube by multiple lead fine threads.

2. A sight according to claim 1 in which the tube has an enlarged end upon which the eyepiece is mounted, the eyepiece being generally cylindrical.

References Cited

UNITED STATES PATENTS

| | | | |
|---|---|---|---|
| 3,161,716 | 12/1964 | Burris et al. | 350—42 X |
| 3,297,389 | 1/1967 | Gibson | 350—54 |
| 3,320,671 | 5/1967 | Rickert et al. | 350—10 X |

FOREIGN PATENTS 21,120  11/1903  Great Britain.

OTHER REFERENCES

Carpenter and Robertson: Metals, Vol. I, Oxford Univ. Press, 1939, pp. 795–798.

DAVID SCHONBERG, Primary Examiner.

T. H. KUSMER, Assistant Examiner

U.S. Cl. X.R.

350—43, 46